US012026423B1

(12) United States Patent
Miller et al.

(10) Patent No.: US 12,026,423 B1
(45) Date of Patent: Jul. 2, 2024

(54) CONSUMABLES DISPENSER WITH DISPLAY

(71) Applicant: American Paper Converting Inc., Woodland, WA (US)

(72) Inventors: Cody Miller, Woodland, WA (US); Eric Work, San Carlos, CA (US)

(73) Assignee: American Paper Converting Inc., Woodland, WA (US)

( * ) Notice: Subject to any disclaimer, the term of this patent is extended or adjusted under 35 U.S.C. 154(b) by 887 days.

(21) Appl. No.: 16/951,302

(22) Filed: Nov. 18, 2020

Related U.S. Application Data

(60) Provisional application No. 62/937,134, filed on Nov. 18, 2019.

(51) Int. Cl.
*G06F 3/0482* (2013.01)
*A47F 7/00* (2006.01)
*A47F 10/02* (2006.01)
*G06F 3/147* (2006.01)
*H04L 67/06* (2022.01)
*H04L 67/568* (2022.01)
*A47K 10/32* (2006.01)

(52) U.S. Cl.
CPC ............ *G06F 3/147* (2013.01); *A47F 7/0042* (2013.01); *A47F 10/02* (2013.01); *H04L 67/06* (2013.01); *H04L 67/568* (2022.05); *A47F 2010/025* (2013.01); *A47K 10/32* (2013.01); *G06F 3/0482* (2013.01)

(58) Field of Classification Search
CPC .. G06F 3/0482; G06F 3/147; A47F 2010/025; A47F 7/0042; A47F 10/02; A47K 10/32; H04L 67/568
See application file for complete search history.

(56) References Cited

U.S. PATENT DOCUMENTS

| 2012/0078741 A1* | 3/2012 | DeLine | B67D 7/348 |
| | | | 705/26.1 |
| 2013/0166302 A1* | 6/2013 | Mercado | G10L 21/00 |
| | | | 704/E15.005 |
| 2014/0344034 A1* | 11/2014 | Goodman | G06Q 30/0241 |
| | | | 705/14.12 |

(Continued)

OTHER PUBLICATIONS

"Representational State Transfer," Wikipedia, https://en.wikipedia.org/wiki/Representational_sate_transfer, printed Nov. 16, 2020, 7 pages.

*Primary Examiner* — Anil K Bhargava
(74) *Attorney, Agent, or Firm* — Klarquist Sparkman, LLP

(57) ABSTRACT

A consumables dispenser can include a housing configured to receive a consumables product to be dispensed, a transceiver mounted on the housing and configured to receive selected multimedia data files from a content management system via a multimedia caching server that is in wireless communication with the content management system, and a display screen coupled to the housing and connected to the transceiver. The display screen can be configured to display the selected multimedia data files to a user of the consumables dispensers. The consumables dispenser can further include a sensor configured to detect presence or absence of the user of the consumables dispensers. Display of the selected multimedia data files on the display screen can be enabled upon detection of the user's presence and disabled upon detection of the user's absence.

20 Claims, 13 Drawing Sheets

(56) References Cited

U.S. PATENT DOCUMENTS

| | | | |
|---|---|---|---|
| 2016/0090288 A1* | 3/2016 | Givens, Jr. | G07F 13/065 |
| | | | 700/283 |
| 2016/0092034 A1* | 3/2016 | Pillai | H04N 21/41415 |
| | | | 715/733 |
| 2017/0109722 A1* | 4/2017 | Morris | G06Q 20/3278 |
| 2018/0362322 A1* | 12/2018 | Peters | G06Q 10/087 |
| 2019/0339936 A1* | 11/2019 | Brahimi | G10L 15/22 |
| 2021/0077646 A1* | 3/2021 | Riggio | G08B 21/245 |
| 2021/0174234 A1* | 6/2021 | Mathew | G06N 5/02 |
| 2022/0107632 A1* | 4/2022 | Sinha | G06Q 10/0631 |
| 2023/0297974 A1* | 9/2023 | Bowles | G06Q 30/0611 |
| | | | 705/23 |
| 2023/0305861 A1* | 9/2023 | Cieslak | G06F 11/3058 |

\* cited by examiner

CONSUMABLES DISPENSER WITH DISPLAY

CROSS-REFERENCE TO RELATED APPLICATIONS

This application claims the benefit of U.S. Provisional Patent Application Ser. No. 62/937,134, entitled "CONSUMABLES DISPENSER WITH DISPLAY," filed on Nov. 18, 2019, which is incorporated by reference in its entirety herein for all purposes.

BACKGROUND

In order to display bulletin messages, broadcast, promotions, and the like inside of a restroom, paper flyers and bulletin boards are typically required. The lack of centralized management and the difficulty of updating messages is a limitation on the ability to deliver or share information, bulletins, and advertisement messages. Accordingly, there exists a need for improvements to systems and methods of displaying content in restrooms.

SUMMARY

Certain embodiments of the disclosure concern a method including: selecting a multimedia data file based on one or more parameters associated with a consumables dispenser by a content management system, the consumables dispenser including a display screen and a transceiver; transmitting the selected multimedia data file to a multimedia caching server associated with the consumables dispenser; and over a network, transmitting the selected multimedia data file from the multimedia caching server to the transceiver of the consumables dispenser for displaying to users of the consumables dispenser on the display screen.

In certain embodiments, the consumables dispenser can be a paper product dispenser In certain embodiments, the multimedia caching server can be in wireless communication with the content management system.

In certain embodiments, the selected multimedia data file can include a playlist of images or videos that are configured to be displayed sequentially or randomly on the display of the consumables dispenser.

In certain embodiments, the method can further include associating one or more first tags with the consumables dispenser in the content management system.

In certain embodiments, the method can further include associating one or more second tags with the selected multimedia data file.

In certain embodiments, the multimedia data file can be selected based on a matching of the one or more first tags with the one or more second tags.

In certain embodiments, the one or more parameters can include a location of the consumables dispenser.

In certain embodiments, the one or more parameters can include a status indicating presence or absence of a user of the consumables dispenser.

In certain embodiments, the method can further include activating the display upon detection of a user being adjacent the consumables dispenser and deactivating the display when no user is detected.

Certain embodiments of the disclosure also concern a system including: a plurality of consumables dispensers having respective displays; a content management system storing multimedia data files; a multimedia caching server configured to download selected multimedia data files from the content management system; an API/player emulator tool in communication with the multimedia caching server; and a transceiver in communication with the API/player emulator tool and the plurality of consumables dispensers. The transceiver can be configured to provide the selected multimedia data files to the displays of the plurality of consumables dispensers.

In certain embodiments, the content management system can be located in a cloud computing platform. The multimedia caching server can be located on premise with the plurality of consumables dispensers.

In certain embodiments, the plurality of consumables dispensers can be configured to dispense paper product.

In certain embodiments, the content management system can include a user interface through which the multimedia data files can be manually selected.

In certain embodiments, the plurality of consumables dispensers can be associated with one or more first tags and the selected multimedia files can be associated with one or more second tags. At least some of the first tags can represent locations of the plurality of consumables dispensers.

In certain embodiments, the multimedia data files can be selected when the one or more first tags match the one or more second tags.

In certain embodiments, the selected multimedia data files can include a playlist of images or videos that are configured to be displayed sequentially or randomly on the displays of the plurality of consumables dispensers.

In certain embodiments, each of the consumables dispensers can include a sensor configured to detect presence or absence of a user of the consumables dispenser. Display of the selected multimedia data files on the consumable dispenser can be enabled upon detection of the user's presence and disabled upon detection of the user's absence.

Certain embodiments of the disclosure further concern a consumables dispensers including: a housing configured to receive a consumables product to be dispensed; a transceiver mounted on the housing and configured to receive selected multimedia data files from a content management system via a multimedia caching server that is in wireless communication with the content management system; a display screen coupled to the housing and connected to the transceiver, wherein the display screen can be configured to display the selected multimedia data files to a user of the consumables dispensers; and a sensor configured to detect presence or absence of the user of the consumables dispensers. Display of the selected multimedia data files on the display screen can be enabled upon detection of the user's presence and disabled upon detection of the user's absence.

In certain embodiments, the consumables dispensers of claim can be configured as a paper towel dispenser.

The foregoing and other objects, features, and advantages of the disclosed embodiments will become more apparent from the following detailed description, which proceeds with reference to the accompanying figures.

DETAILED DESCRIPTION

The present disclosure pertains to consumable material dispensers, such as paper products dispensers including paper towel dispensers, which include electronic display screens mounted in or on the dispensers. In certain embodiments, the display screens can be used to show any of a variety of communicative media data files to users, such as images, text, audiovisual content such as videos, audios, animations, or other forms of information, which can be tailored to particular end users (e.g., based on the nature of the facility in which the dispenser is located). Such media files are referred to herein collectively as "multimedia" files. The screens and associated hardware can be powered by replaceable or rechargeable battery cells, or can be hard wired into existing building power infrastructure. The multimedia data files displayed on the displays can be transmitted wirelessly, or by wired connection to the dispenser. In certain embodiments, the multimedia data files can be managed and/or transmitted by a central content management system (CMS) described in greater detail below. The CMS system can manage multimedia data files displayed on individual screens, on multiple screens, and/or can schedule automatic rotation of images, video, text, etc., from a multimedia data file library.

Figure 1:
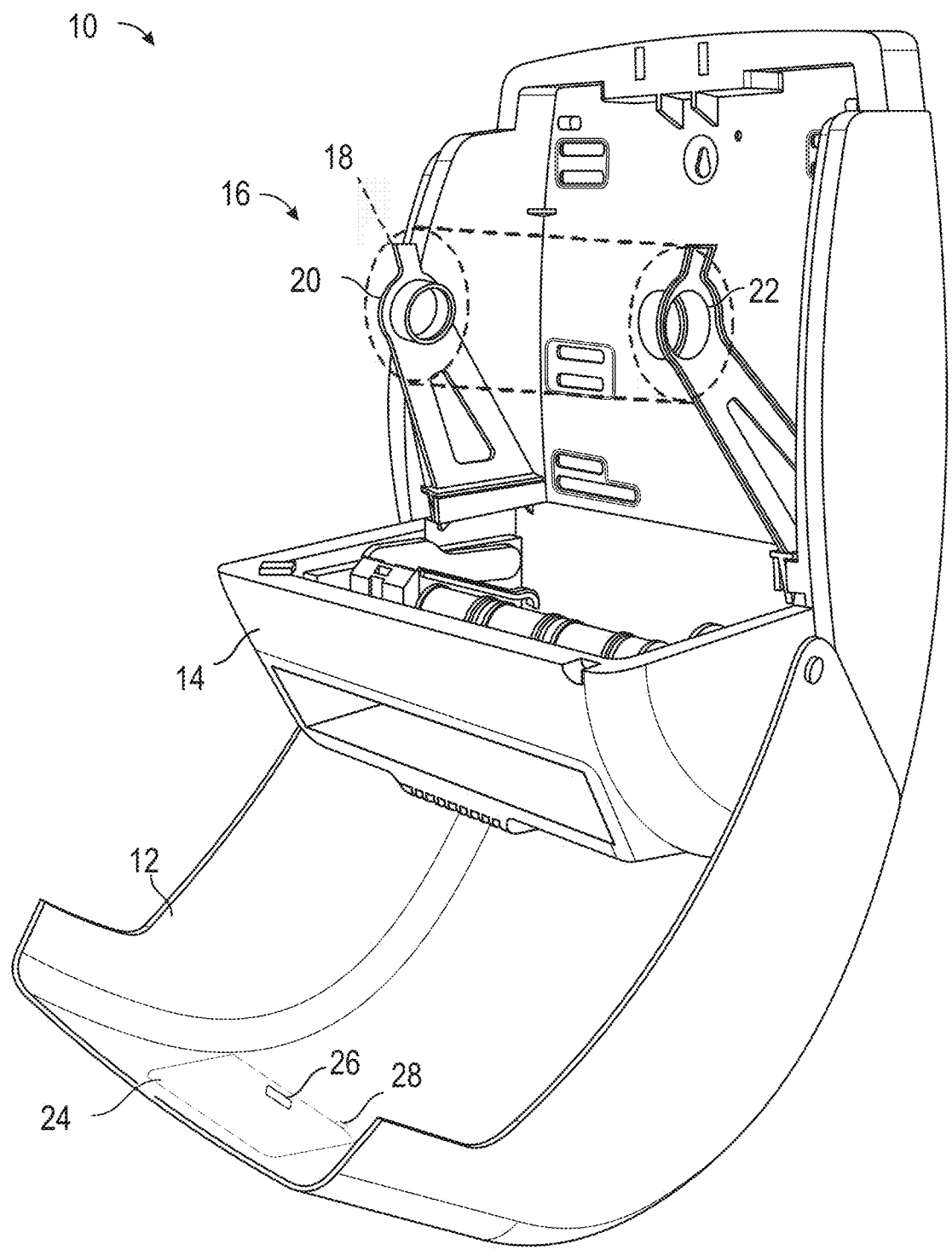
FIG. 1 is a perspective view of a paper towel dispenser, according to one embodiment.

FIG. 1 illustrates a representative embodiment of a consumables dispenser configured as a paper towel dispenser 10. In certain embodiments, the paper towel dispenser 10 can comprise a cover 12 and a housing, main body, or enclosure 14. The cover 12 can be configured to swing or pivot upwardly to a closed position to enclose a mounting portion 16 configured to mount a paper towel roll indicated schematically at 18. The mounting portion 16 can comprise a pair of mounting arms 20 and 22 configured to receive the ends of the paper towel roll. In certain embodiments, a screen 24 (also referred to as "display") can be positioned on the exterior of the housing 14, incorporated into the cover 12, or positioned elsewhere on the structure.

Figure 2:
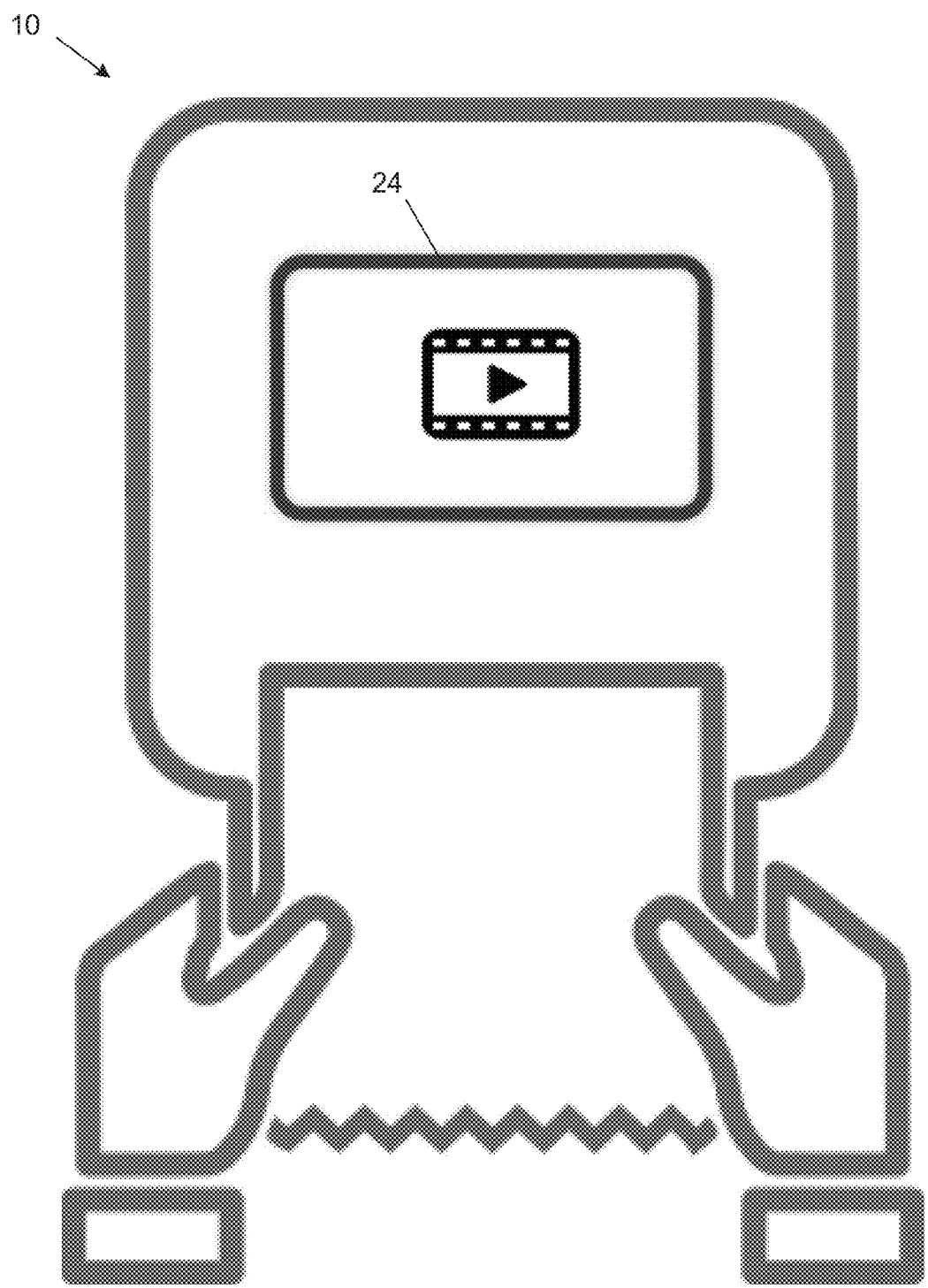
FIGS. 2-4 are schematic block diagrams illustrating a system for providing content to a plurality of consumables dispensers including display screens, according to one embodiment.

For example, FIG. 2 schematically illustrates a display unit or electronic display 24 incorporated into the dispenser 10 on the front of the unit facing the user.

Electronic Display

In certain embodiments, the electronic display 24 can be installed on the inside of the dispenser cover 12 (e.g., FIG. 1) facing a user of the dispenser. The display can be active or passive. In certain embodiments, an "active" display can be activated and/or can provide certain multimedia data files based on one or more parameters associated with the user (e.g., presence of the user, etc.), and/or parameters associated with the location of the dispenser (e.g., the purpose of the building, the nature of an event being held at the location of the dispenser, whether the dispenser is in a men's or a women's restroom, etc.). In certain embodiments, a "passive" display can display multimedia data files independent of inputs or parameters associated with the user. In certain embodiments, an active display can show static images as well as videos. In certain embodiments, the display 24 can include one or more speakers for generating audio signals accompanying the images and/or videos shown on the screen. The display can be liquid crystal display (LCD) screen, which can have RGB color capabilities. The active display may have a motion sensor 28 to detect the presence and/or absence of a user of the consumables dispenser, based on which to activate or initiate delivery of multimedia data files to the user. For example, in certain embodiments, the display can be activated upon detection of a user being adjacent the consumables dispenser and deactivated when no user is detected. In some embodiments, the consumables dispenser can also have one or more sensors (e.g., time-of-flight sensors, accelerometers, pressure sensors, light sensors, etc.) configured to detect the activation of the consumables, as described in U.S. patent application Ser. No. 17/035,475, titled "SYSTEMS AND METHODS FOR RESTROOM CONSUMABLES MONITORING AND MAINTENANCE SCHEDULING," the disclosure of which is incorporated herein by reference. In certain embodiments, active and passive displays can be capable of showing greyscale, multi-color, and/or full color images and/or videos. In certain embodiments, passive displays can be built using electronic ink (e-ink) technology. Passive displays can deliver multimedia data files from a template or an image. Both active and passive displays can be powered by replaceable or rechargeable battery cells or hard wired into building electrical infrastructure. In certain embodiments, the system may also include a speaker.

Alternative Embodiment of Consumables Dispenser

Figure 6A:
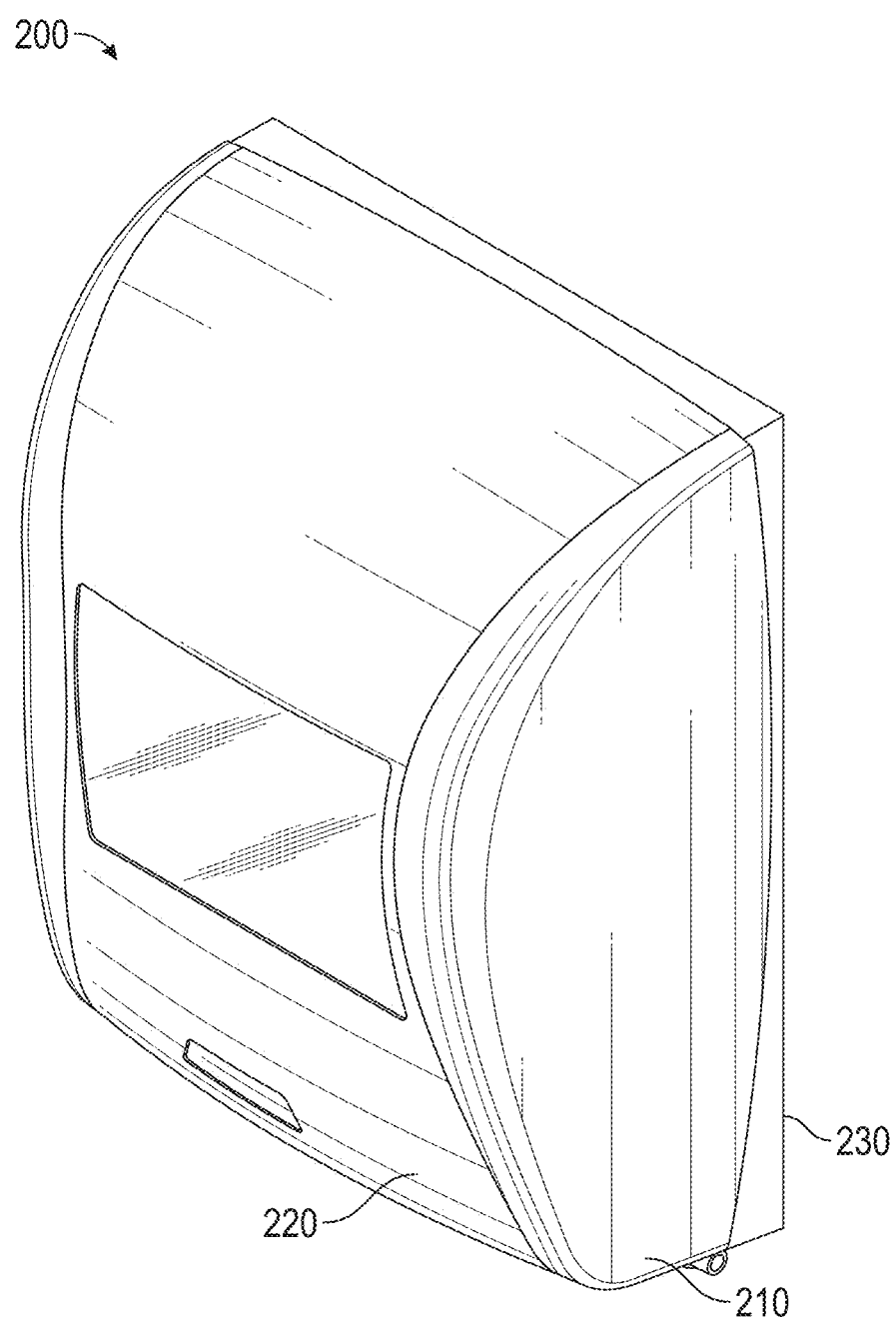
FIG. 6A is a perspective view of a consumable dispenser, according one embodiment.

FIG. 6A shows an alternative embodiment of a consumable dispenser 200, which comprises a front body 210, a front panel 220 mounted on the front body 210, and a rear portion 230. Perspective views of the front panel 220 and the front body 210 are shown in FIGS. 6B and 6C, respectively.

Figure 6B:
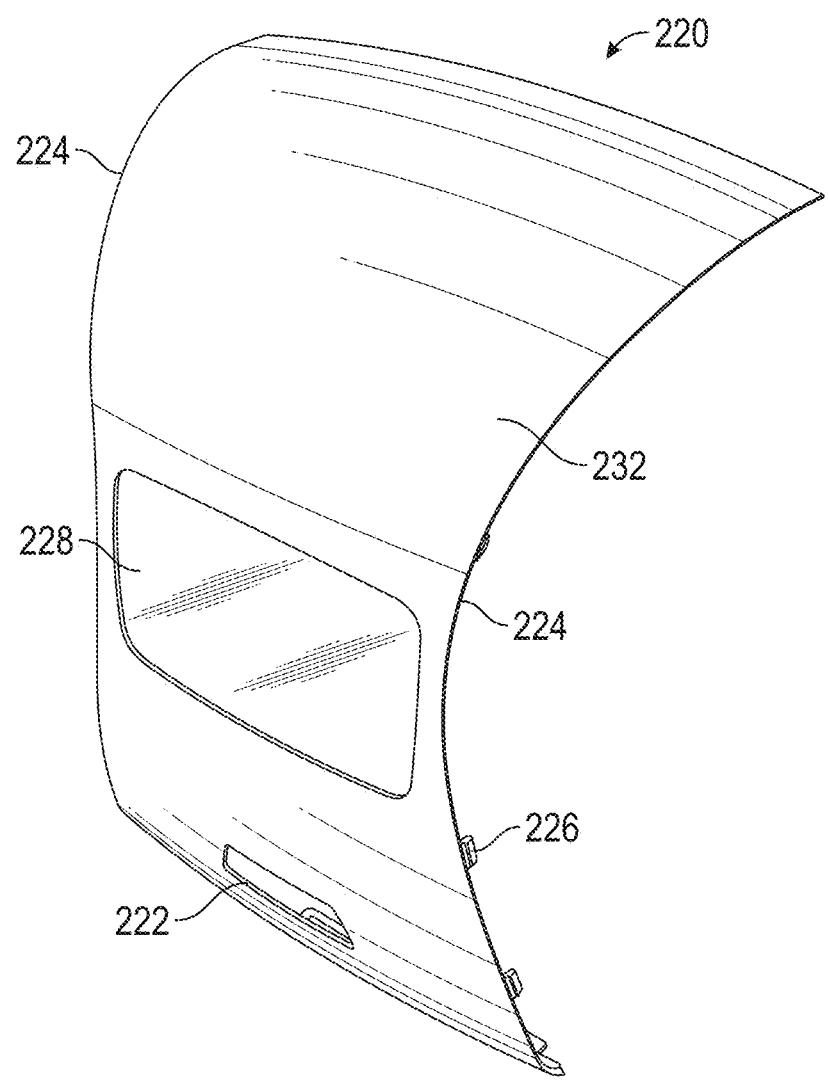
FIG. 6B is a perspective view of a front panel of the consumables dispenser of FIG. 6A.

As shown in FIG. 6B, the front panel 220 can have a curved surface 232 defined between two side edges 224. The front panel 220 can be made of plastic or metal or other types of materials. A plurality of pins/tab members 226 can be located along the side edges 224 and extend outwardly from the back of the curved surface 232. The middle portion of the front panel 220 can have a display window 228, which can have a generally rectangular shape, the corners of which can be square or rounded. In the depicted embodiment, the display window 228 is transparent or translucent. For example, in one embodiment, the display window 228 can be made of clear plexiglass. In another embodiment, the display window 228 can be void (i.e., forming a through hole). In yet another embodiment, the front panel 220 can have a completely covered/solid surface 232 without the display window 228. Optionally, the front panel 220 can also have a status window 222, which can be transparent or translucent. Although the status window 222 is located below the display window 228 in the depicted embodiment, it is to be understood that the status window 222 can be placed anywhere on the curved surface 232.

Figure 6C:
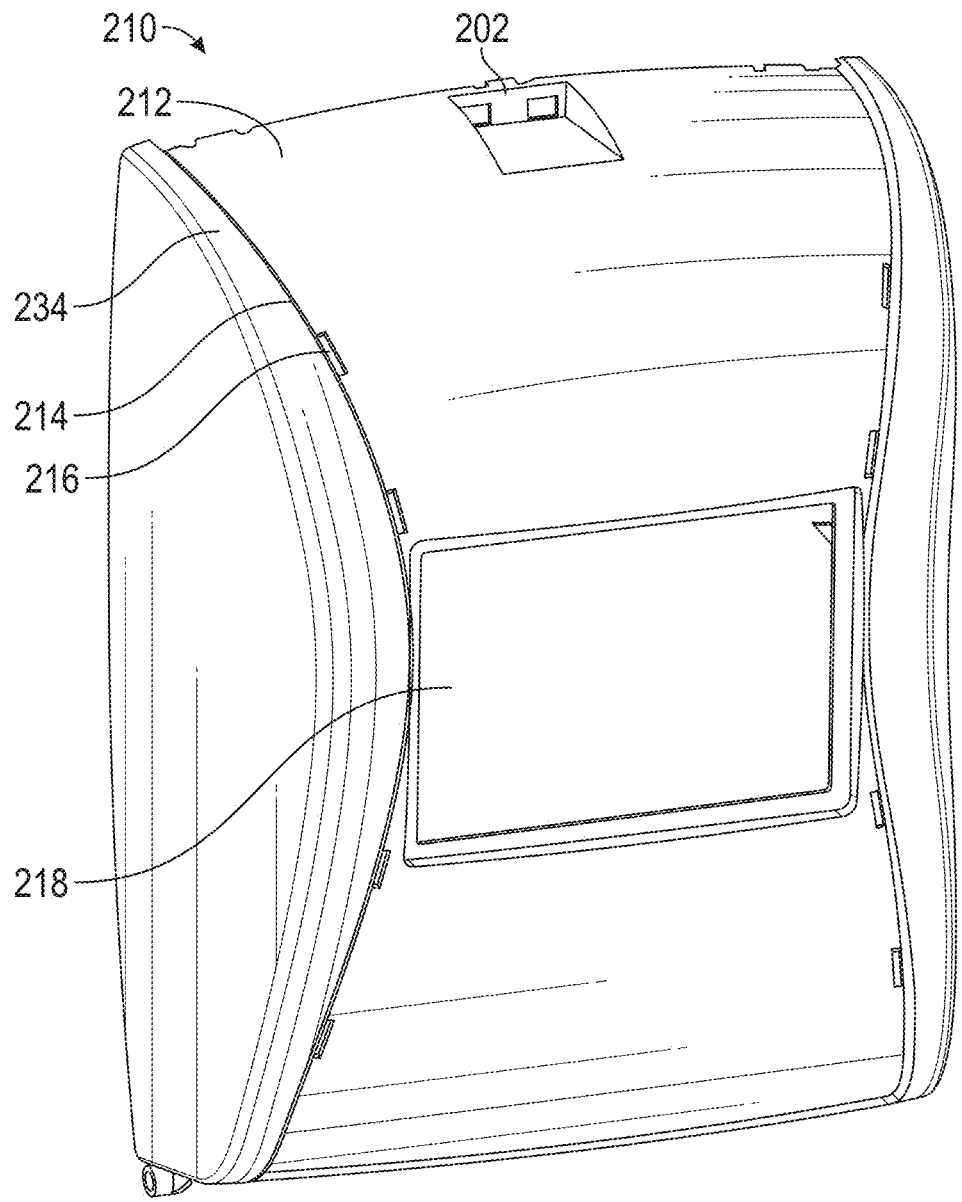
FIG. 6C is a perspective view of a front body of the consumables dispenser of FIG. 6A.
Figure 7A:
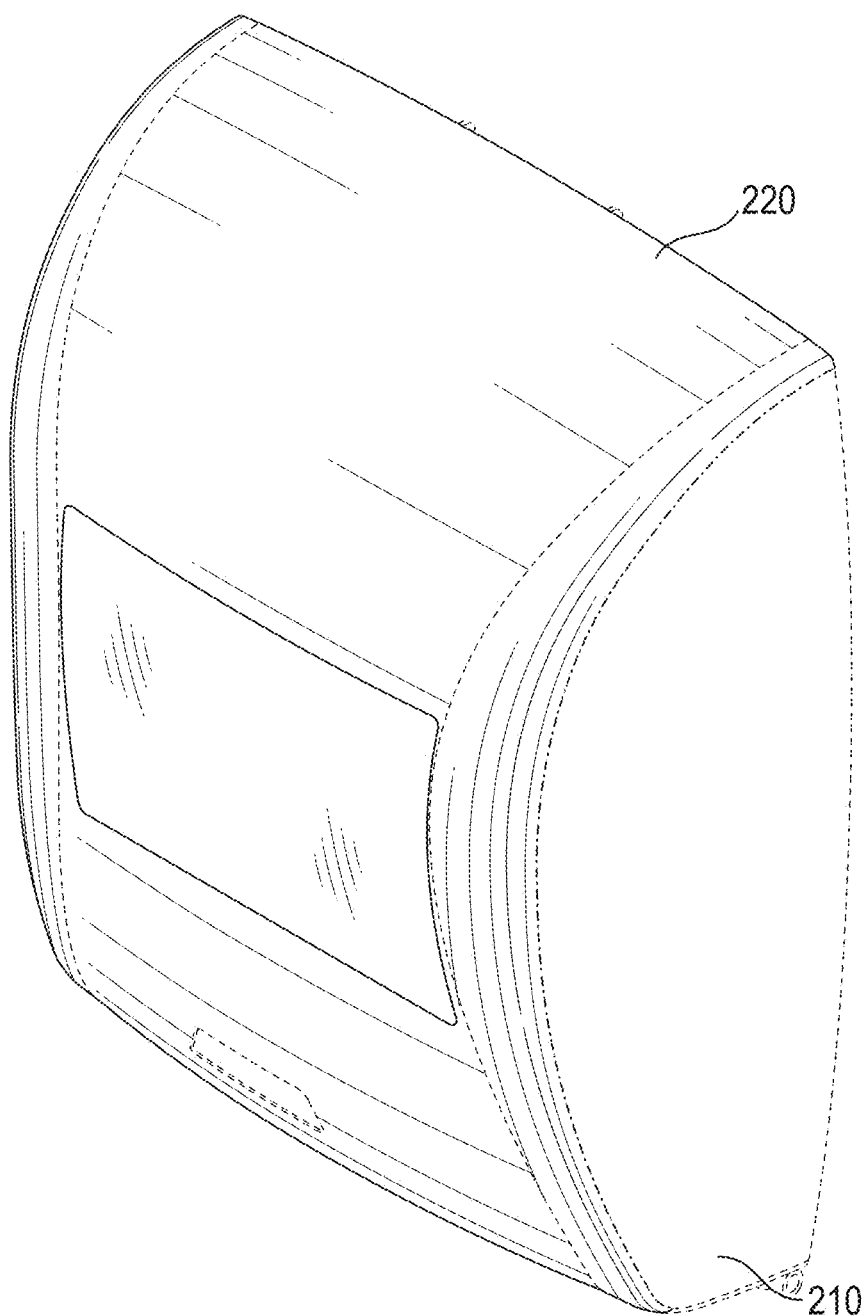
FIG. 7A-7G are different views of a front portion of the consumables dispenser of FIG. 6A.
Figure 7B:
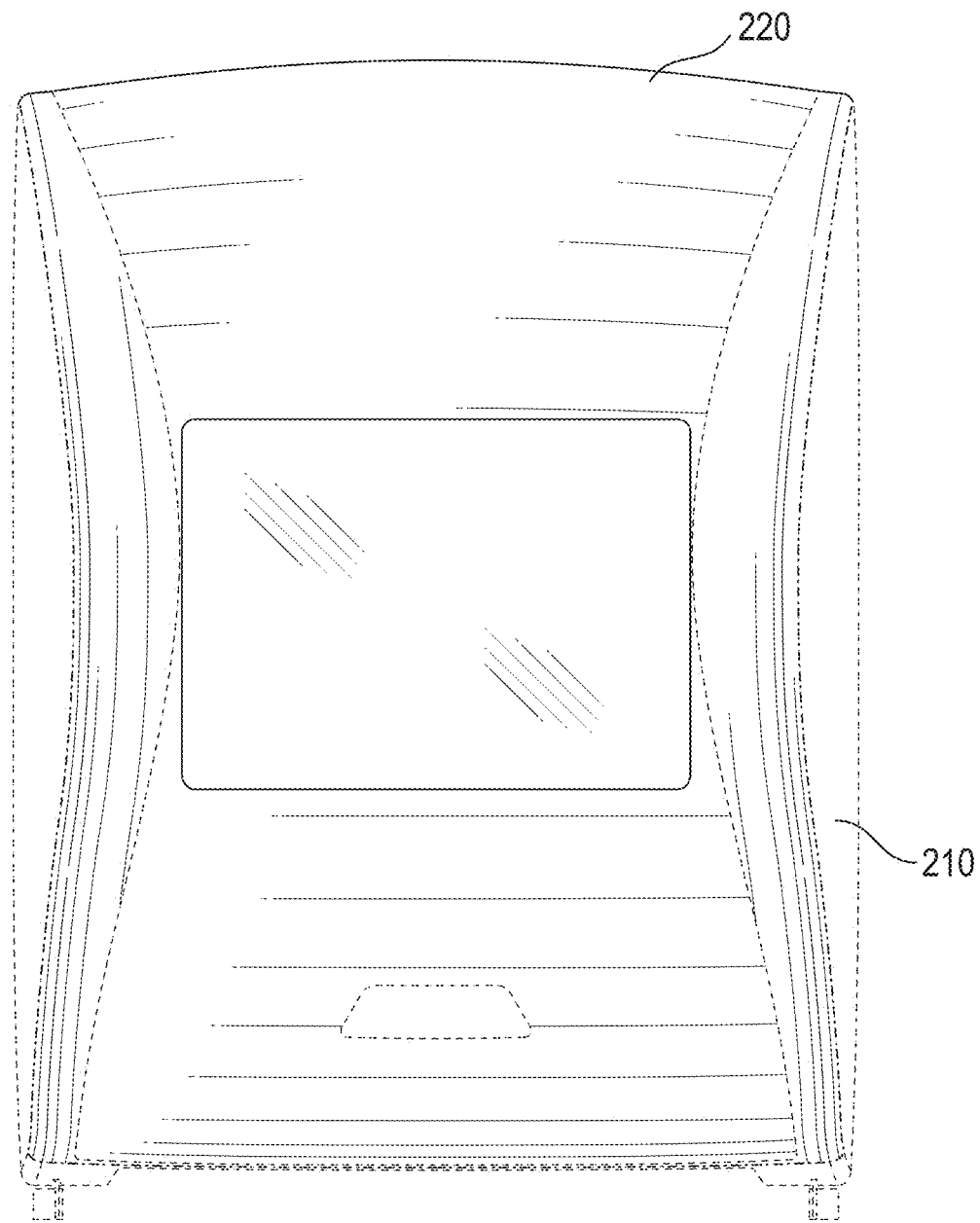
Figure 7C:
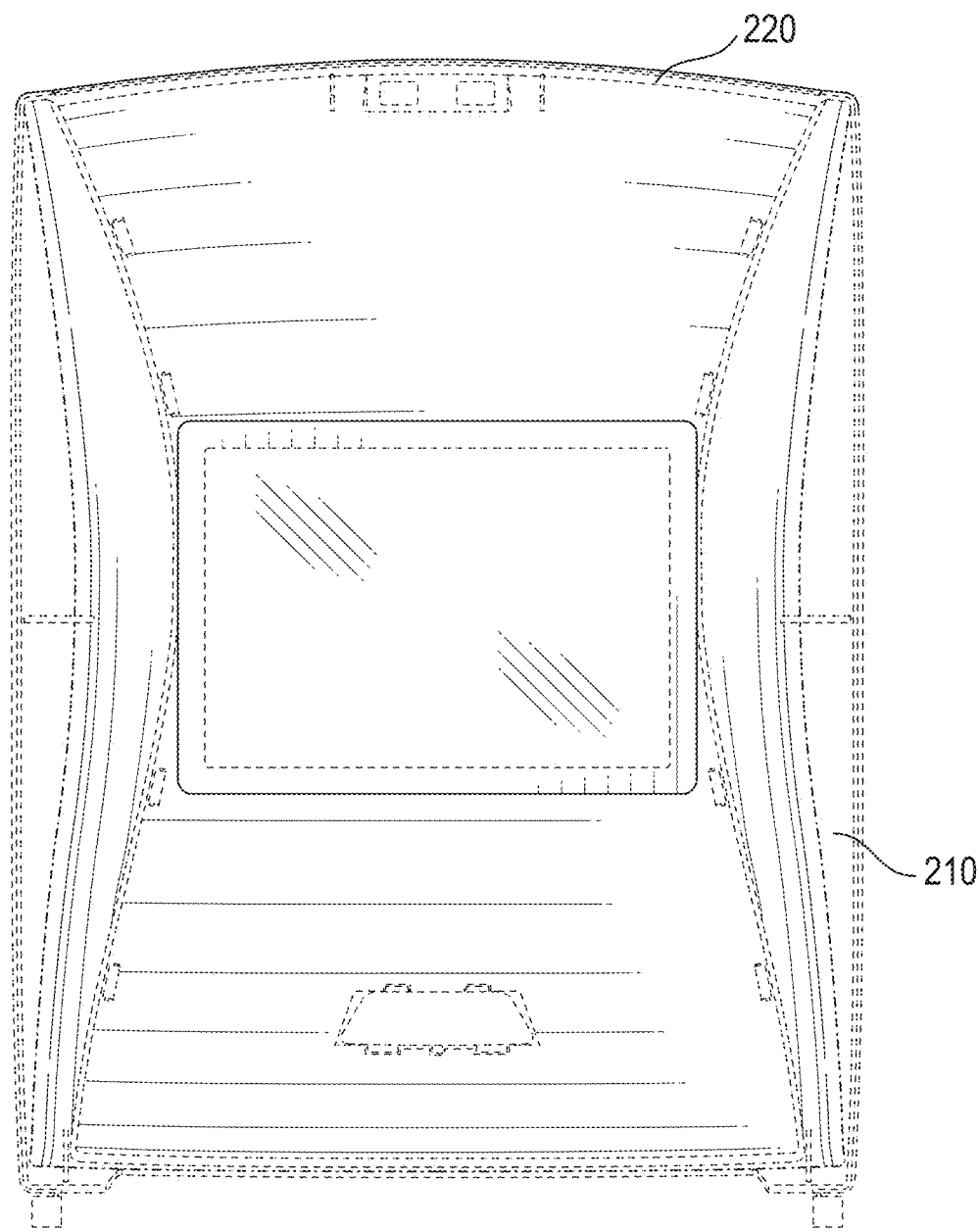
Figure 7D:
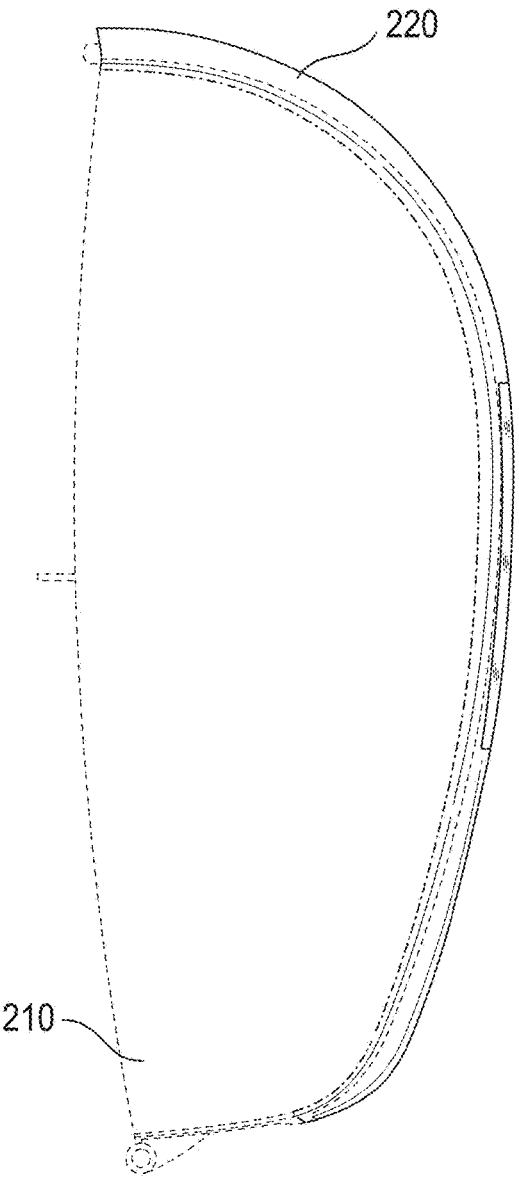
Figure 7E:
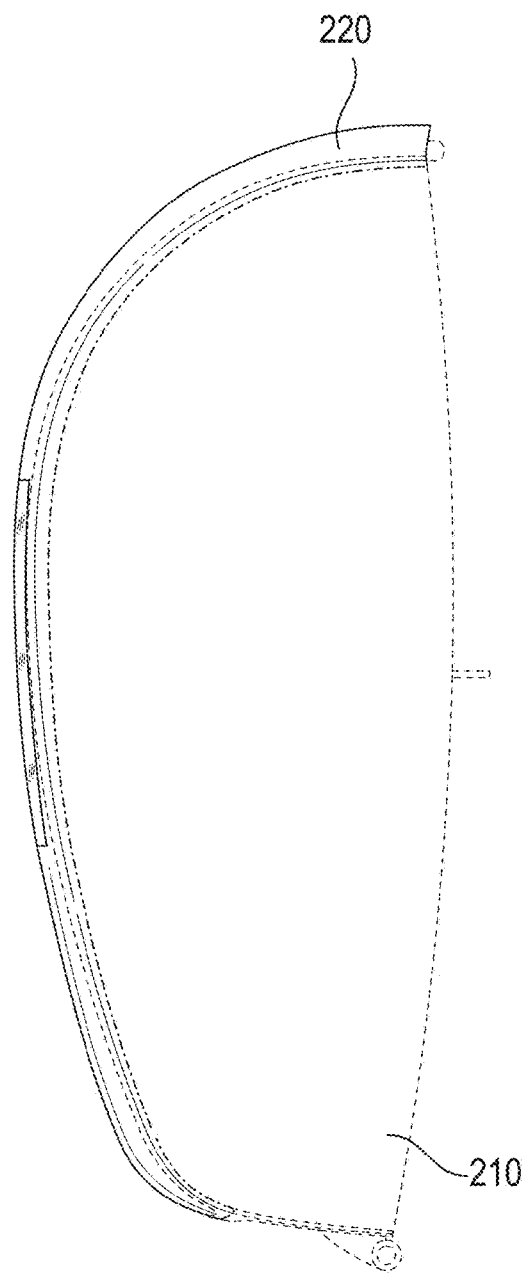
Figure 7F:
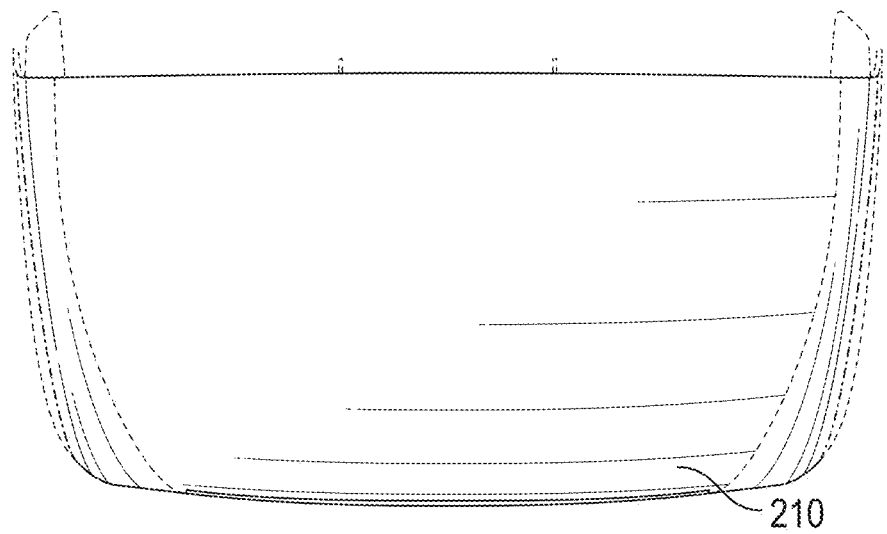
Figure 7G:
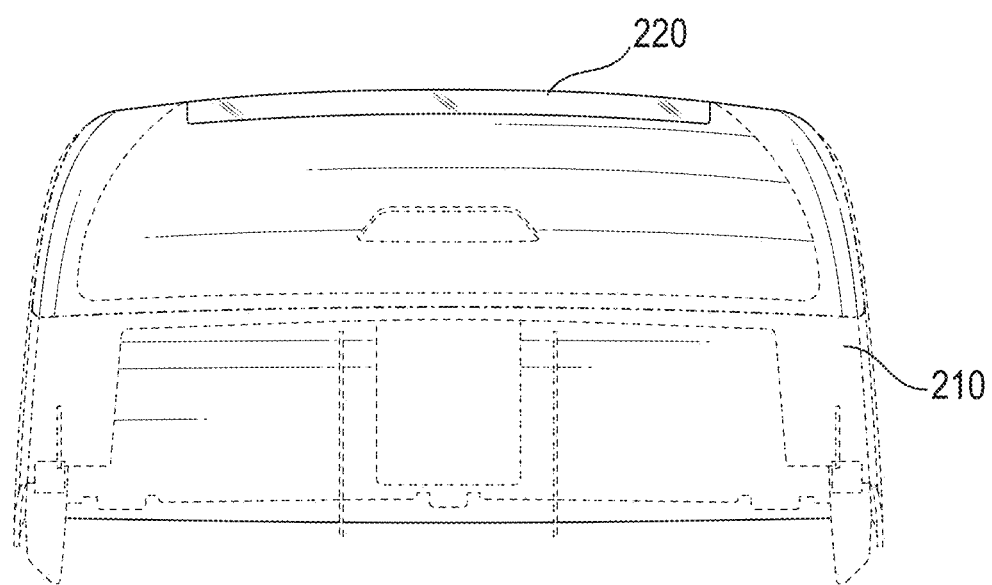

As shown in FIG. 6C, the front body 210 has a front surface comprising a middle portion 212 and two side portions 234 located on the left and right sides of the middle portion 212. The middle portion 212 can be slightly recessed from the two side portions 234. The connection between the middle portion 212 and the two side portions 234 can define two side walls 214. A plurality of notches/slots/openings 216 can be located on the middle portion 212 along the two side walls 214. The dimension, shape, and curvature of the middle portion 212 can be configured to match those of the front panel 220. For example, the curvature of the two side walls 214 can match the corresponding side edges 224 of the front panel 220. In addition, the location and size of the notches 216 can be configured to match those of the pins 226 protruding from the back of the front panel 220. Thus, by placing the front panel 220 over the middle portion 212 and pressing them together, the pins 226 can be respectively clipped into the notches 216 so that the front panel 220 can be snapped onto the front body 210 to form a unitary front portion (also referred to as the "front cover" hereinafter). As examples, FIGS. 7A-7G show different views (i.e., front perspective view, front view, rear view, left side view, right side view, top view, and bottom view, respectively) of the front cover, according to one embodiment.

In some embodiments, the depth of the side walls 214 can be generally about the same as the thickness of the front panel 220 so that the curved surface 232 of the front panel 220 can be flush with the side portions 234 of the front body 210 when in place on the front body 210. The middle portion 212 of the front body 210 can define an opening configured as a window frame 218, which can be sized, shaped, and positioned to match the display window 228 of the front panel 220. In some embodiments, an electronic display, such as 24 described above, can be received by the window frame 218. Thus, when snapping the front panel 220 to the front body 210, the electronic display can be sandwiched/secured between the front body 210 and the front panel 220. Additional and/or alternative fastening mechanisms (e.g., screws, clips, fasteners, etc.) can be applied to secure the electronic display between display window 228 of the front panel and the window frame 218 of the front body 210.

In some embodiments, the dispenser 200 can have one or more indicators (e.g., in the form of light emitting diodes or other types of visual displays) that are located in an area on the front body 210 (e.g., through a window or a recessed area on the middle portion 212) that is behind the status window 222 of the front panel 220. Such indicators can be in communication with one or more sensors (e.g., the motion sensor, light sensor, etc.) and/or the display screen of the dispenser 200 to provide various indicators to a user of the dispenser 200, such as presence and/or loss of wireless communication, status of power supply, full/moderate/empty status of the consumables product in the dispenser, etc.

The dispenser 200 can have internal structures (e.g., similar to the mounting arms 20, 22 as shown in FIG. 1) for holding and/or dispensing the consumables. In addition, the front body 210 can have one or more coupling members 202 configured to connect with respective coupling members of the rear portion 230 so that the front body 210 can be releasably coupled to the rear portion 230, as shown in FIG. 6A. The rear portion 230 can also have mounting brackets or other means (e.g., screws, glue, sticky pads, etc.) for mounting the rear portion 230 to a mounting surface (e.g., walls).

Wireless Data Communication

In certain embodiments, the displays 24 can be in communication with one or more remote systems, such as computers, controllers, and/or content servers. In certain embodiments, the displays 24 can have transceivers 26 incorporated into the display screen units, and/or coupled to the cabinet body of the dispensers and connected to the display screens. Data may be transmitted wirelessly via any of various wireless communications standards or protocols, such as IEEE 802.11 wireless infrastructure, as well as any of various proprietary communication protocols in an access point & client relationship. The wireless frequencies used can be, for example, unlicensed bands including 433 MHz, 900 MHz, 2.4 GHz, and/or 5 GHz. Wireless communication can be 2-way between the hardware associated with the display and the content server, allowing packets to be sent back confirming successful transmission of the data, battery level, temperature, and any other sensor data.

Content Management System (CMS)

Figure 3:
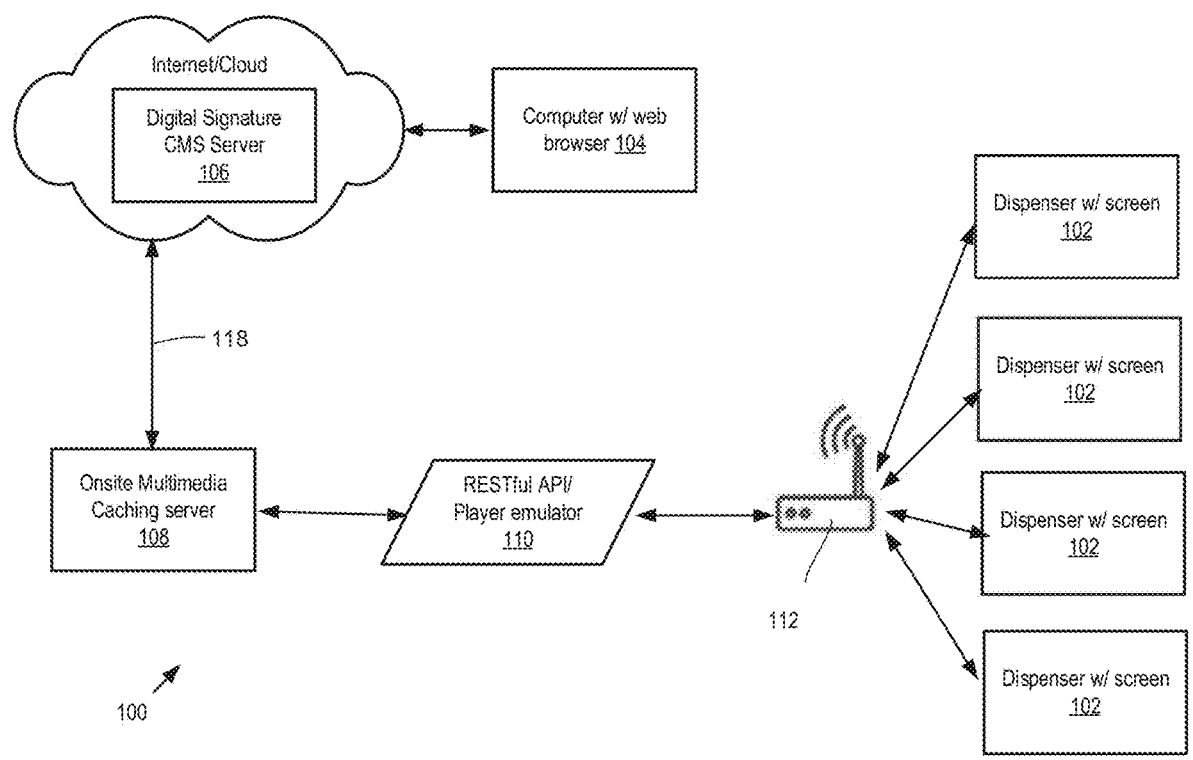

FIG. 3 illustrates a schematic diagram of a system 100 for delivering multimedia data files to a plurality of consumable product dispensers 102 including displays, according to one embodiment. The system 100 can comprise a computer 104 including a web browser. The computer 104 can be in communication with a digital signage content management system (CMS) server 106, which can be in communication with a multimedia caching server 108. In certain embodiments, the computer 104 can be in communication with other components of the system as well. In certain embodiments, the CMS server 106 can be a remote computing platform such as a cloud computing platform. In certain embodiments, the multimedia caching server 108 can be located on the premises (e.g., onsite) with the dispensers 102. In other embodiments, the multimedia caching server 108 may be remote from the dispensers 102. In certain embodiments, the multimedia caching server 108 can facilitate faster delivery of multimedia data files over slower network connections or high-density installations of displays. The system can further comprise an API/player emulator tool 110 in communication with the multimedia caching server 108. The API/player emulator tool 110 can be in communication with a transceiver/wireless communications module/modem/base station 112 (e.g., on the premises with the dispensers 102), which can be in wireless communication with the dispensers 102 (e.g., via the transceivers of the display screens).

In certain embodiments, the API/player emulator tool 110 can be configured to implement REpresentational State Transfer (REST) software architecture, which can include constraints for creating Web services. Thus, in certain embodiments, the API/player emulator tool 110 can implement a "RESTful" API configured to provide interoperability between computer systems according to REST standards/styles. In addition, RESTful Web services allow the requesting systems to access and manipulate textual representations of Web resources by using a uniform and predefined set of stateless operations. As described herein, the RESTful API can be implemented by an application server which receives REST commands from a multimedia server, which can be an onsite cache, such as 108, or an onsite or offsite CMS server, such as 106. The API/player emulator tool 110 can interpret the received REST commands and render, pre-process, post-process, and/or manipulate the multimedia data files (e.g., images and/or videos) using a method so that it is compatible with the display 102. The API/player emulator tool 110 may also change the dimensions and/or colors of the images, dither the images, extract video frames, or render a web page to an image format so that the CMS content can be displayed correctly.

Figure 4:
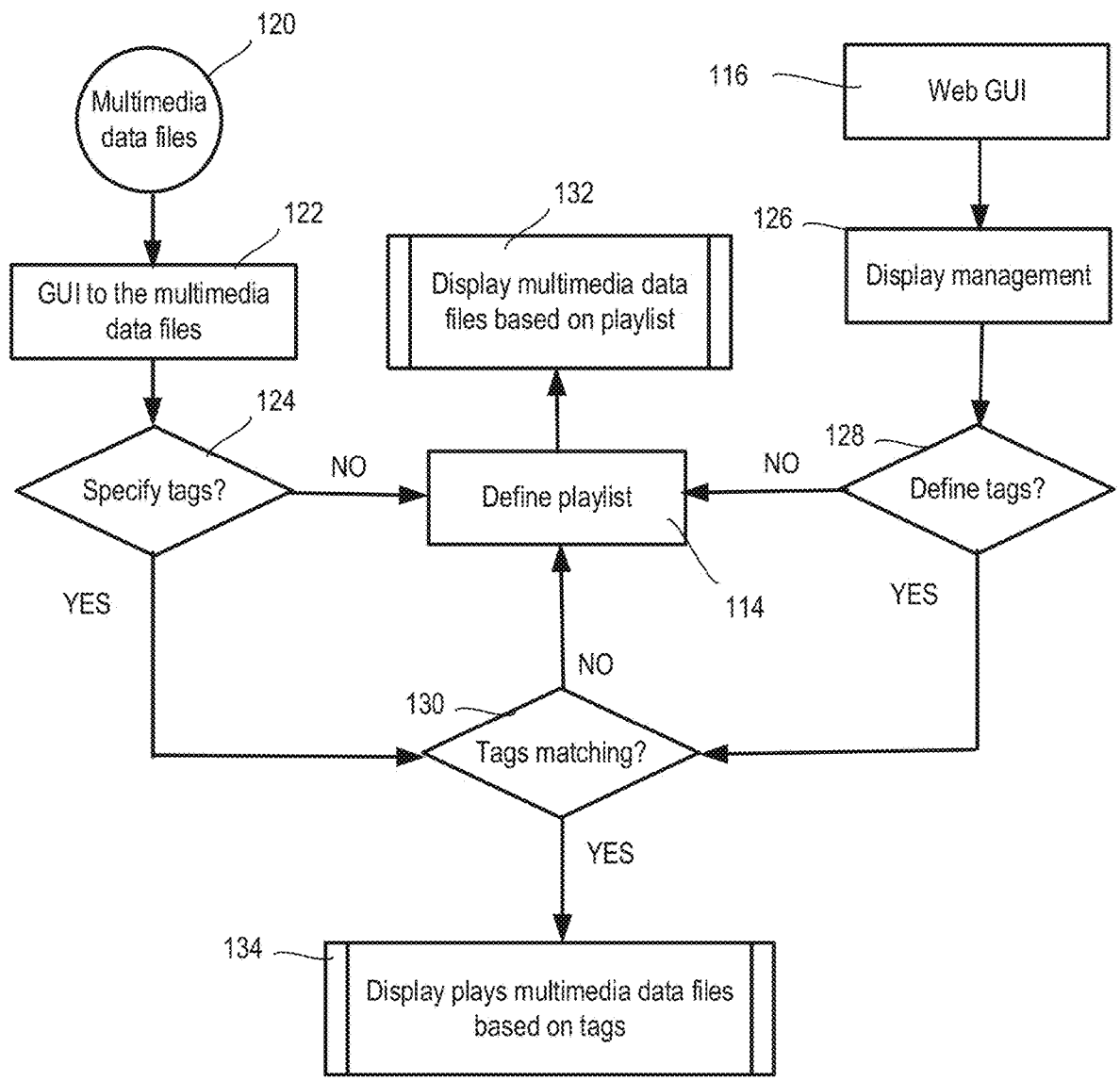

Referring to FIG. 4, in certain embodiments, the content management system can manage the adoption of the display hardware to be managed by a particular organization or site. The CMS server 106 can manage transmitting multimedia data file (e.g., images, videos) to either a single display or multiple displays. In certain embodiments, the CMS server 106 can select multimedia data files and/or schedule the order of play or rotation of multimedia data files, such as defining a playlist 114, on displays based on a variety of parameters. In certain embodiments, the playlist 114 can contain a subset of multimedia data files downloaded from the CMS server 106 to the multimedia caching server 108.

The selected multimedia data files on the playlist can be displayed sequentially or randomly on the displays of the consumables dispensers. In certain examples, the parameters can include a number of motion activations (e.g., based on the detection of users' presence by the motion sensor), dispenser activations (e.g., based on the detection of activities associated with dispensing of the consumables product by one or more sensors), and/or parameters based on time, such as the amount of time since a multimedia data file was last played/displayed.

In addition to the defined playlist, a plurality of tags can be used to deliver customized content at target dispensers. In some example embodiments, the tags can be in the form of character strings or numerical values or other format that represent categories or subcategories such as the type of media, location, target audience, time of day, etc. For example, the tags can represent types of business (e.g., restaurants, hotels, airports, stadiums, etc.), types of products (e.g., apparels, hygiene/beauty products, food/drink, etc.), types of events (e.g., conferences, concerts, sporting events), etc.

As shown in FIG. 4, the multimedia data files 120 to be downloaded from the CMS server 106 to the multimedia caching server 108 can be associated with corresponding tags. In one embodiment, the association of tags to the multimedia data files can be defined through a graphical user interface (GUI) 122, through which an operator of the CMS can specify/apply/associate tags to the multimedia data files 120. As described herein, one particular multimedia data file can be associated no tag, or a single tag, or multiple tags. For example, one particular multimedia file about a Lebanese restaurant located in an airport can be associated multiple tags including "restaurant," "food," "drink," "Mediterranean," "airport," "travel," etc.

In addition, tags can be associated with selected display screens of the consumables dispensers based on, for example, location and/or demographic data. For example, through a Web GUI 116 (which can be the same as or different from the GUI shown in 122) in connection with a display management 126 software module, an operator of the CMS can define one or more tags associated with the consumables dispensers based on, in part, where the multimedia data files may be most effective when delivered to users of the consumable dispensers. For example, multimedia data files related to beauty products may be desirably shown in women's restrooms and/or men's restrooms. Thus, corresponding tags, e.g., "beauty product," "female" or "male," etc., can be associated with the consumables dispensers in those locations. In another example, the consumables dispensers located in a restroom at the airport can be associated with one or more tags (e.g., "restaurant," "duty-free shops," "beauty salon," etc.), which are specific to their locations and/or types of businesses nearby.

As described herein, respective tags can be used to deliver multimedia data files tailored to a specific demographic based on information or parameters associated with that demographic. Thus, in certain embodiments the CMS server 106 can select multimedia data files (to be transmitted to the multimedia caching server 108 for displaying by the consumable dispensers 102) based on parameters including tags associated with the multimedia data files (e.g., defined via 122) and/or tags associated with one or more particular screens/dispenser units (e.g., defined via 116). In certain embodiments, the multimedia caching server 108 and/or other tools of the system can determine which dispenser or dispensers to provide specific multimedia data files to for display based on factors associated with the dispenser, such as its location and/or businesses nearby. In certain embodiments, the multimedia data files to be delivered to the consumables dispensers can be manually selected, e.g., through the Web GUI 116 and/or GUI 122.

In certain embodiments, when the multimedia data files have no associated tags (e.g., the condition check at 124 returns "NO"), the consumable dispensers can display certain selected multimedia data files 132 based on the predefined playlist 114. In addition, when the consumables dispensers have no associated tags (e.g., the condition check at 128 returns "NO"), the consumable dispensers can also display the selected multimedia data files 132 based on the predefined playlist 114. Further, when the tags associated with the multimedia data files and the tags associated with the consumables dispensers do not match (e.g., the condition check at 130 returns "NO"), then the consumable dispensers can also display those selected multimedia data files 132 based on the predefined playlist 114. On the other hand, when the tags associated with certain multimedia data files and the tags associated with the consumables dispensers are matching (e.g., the condition check at 130 returns "YES"), the consumable dispensers can display those multimedia data files with the matching tags 134.

As described herein, the determination of matching tags at 130 can be implemented in a variety of ways. For example, in one embodiment, two tags are deemed matching if one tag is identical to the other tag (e.g., "airport"="airport"). In another embodiment, two tags are deemed matching if one tag is a subcategory of another tag according to a predefined category dictionary (e.g., "women apparel" can be a predefined subcategory of "apparel"). In yet another embodiment, two tags are deemed matching if one tag is semantically related to another tag according to a predefined schema (e.g., "airport" can be semantically related to "travel" according to a predefined schema).

As described herein, when multiple tags are associated with the consumables dispensers and/or the multimedia data files, matching can be determined based on any one pair of tags. In other words, assuming a first set of tags are associated with a particular consumables dispenser, and a second set of tags are associated with a particular multimedia data file, matching can be found if one tag from the first set of tags is deemed to match one tag from the second set of tags. For example, if a consumable dispenser is associated with two first tags "airport" and "restaurant," and a multimedia data file has two second tags "airport" and "hotel," matching tags can be determined because the tag "airport" is associated with both the consumable dispenser and the multimedia data file.

The CMS server 106 can report the number of deliveries/displays of particular multimedia data files. In one embodiment, the CMS server 106 can keep a log of multimedia data files sent to the multimedia caching server 108, and the report can be generated based on such log. In another embodiment, the API/player emulator tool 110 can keep a record for each delivery/display of the multimedia data files by the displays of the dispensers 102, and such record can be sent to the CMS server 106 to generate the report. In yet another embodiment, each dispenser's display can have an internal register that counts the number of displays of particular multimedia data files, and such counts can be collected by the CMS server 106 for generation of the report. This reporting can be used, for example, for determining the number of times a multimedia data file corresponding to a company or a particular product has been or will be played.

Any other messages or bulletins, such as announcements pertaining to health or safety, can also be provided to the screens to be viewed with the CMS platform, as well as scheduled in a rotation with other messages or bulletins, or published immediately when urgent.

API Integration

In certain embodiments, application program interface (API) integration can enable communication and transmission of multimedia data files between the wireless communicator (e.g., the transceiver associated with the display screen) and the CMS server 106. This can be handled through a communication process where the CMS server 106 triggers the wireless communicator 112 to download multimedia data files from the CMS server 106 and deliver it to one or more displays 102.

In certain embodiments, via the API/player emulator tool 110, the CMS server 106 can push the multimedia data files to the access point (e.g., a dispenser 102) where a display screen is connected. In certain embodiments, the CMS server 106 can transmit the multimedia data files to the multimedia caching server 108 periodically (e.g., once a day, or any length of period between transmissions), or automatically triggered (e.g., upon an update of certain multimedia data files on the CMS server 106), or on-demand (e.g., an operator of the CMS server 106 can trigger the transmission). When the multimedia data files are periodically sent to the multimedia caching server 108, the transmission period can be scheduled so that the transmission occurs off-peak, e.g., at or around midnight. In certain embodiments, the transmission period can vary based on factors such as location of the dispensers, content of the multimedia data files, data size of the multimedia data files, etc. In certain embodiments, the transmission of multimedia data files from the CMS server 106 to the multimedia caching server 108 can be grouped in one batch or multiple batches, depending on the data size of the multimedia data files. In some embodiments, the multimedia caching server 108 can periodically interrogate the CMS server 106 to check if new multimedia data files are available to download.

In certain embodiments, the display screen of the dispenser 102 can remain in a sleep mode to save power until it wakes up and scans the multimedia caching server 108 for any updates of multimedia data files. If there is an update of the multimedia data files, the display screen of the dispenser 102 can download or "pull" the multimedia data files from the multimedia caching server 108 so as to update and refresh the display with new content. In some embodiments, the display screen of the dispenser 102 can be configured to wake up periodically (e.g., every 15 minutes or other durations). In some embodiments, the display screen of the dispenser 102 can be configured to wake up upon detecting a user's presence or detecting the dispenser activations based on one or more sensors described above.

In some embodiments, the API/player emulator tool 110 can transmit a notification to or "ping" the display screen of the dispenser 102 when new content (e.g., updated multimedia data files) is available on the multimedia caching server 108 so as to trigger the display screen to fetch such new content. In some embodiments, the display screen of the dispenser 102 can periodically interrogate the multimedia caching server 108 and/or the CMS server 106 to check if new multimedia data files are available to download.

Interface

A wired or wireless communication link indicated schematically at 118 (see e.g., FIG. 3) can connect the various computers, servers, gateway devices, and wireless communicators described herein.

Certain components of the system 100 can be in communication with each other over network connections via the internet. Certain tools or components, such as the CMS server 106, can be remotely hosted on one or more cloud computing services or data centers, which can be called upon to support certain aspects of system functionality.

The systems described herein can be used to deliver multimedia data files in the form of advertisements, event information, location information, device information, etc., to users of tissue or towel dispensers.

The systems described herein can be applicable to other types of dispensers, such as toilet paper dispensers, tissue paper dispensers, soap dispensers, etc.

The consumables dispensers described herein can be located in any of a variety of locations or environments, such as restrooms, kitchens, or common areas in facilities such as office buildings, government buildings, conference centers, convention centers, airports, train stations, sports venues such as stadiums, movie theaters, shopping malls, concert venues, schools, hospitals, factories, or other locations where it may be advantageous to display multimedia data files to users of consumables dispensers.

Example Computing Environment

Figure 5:
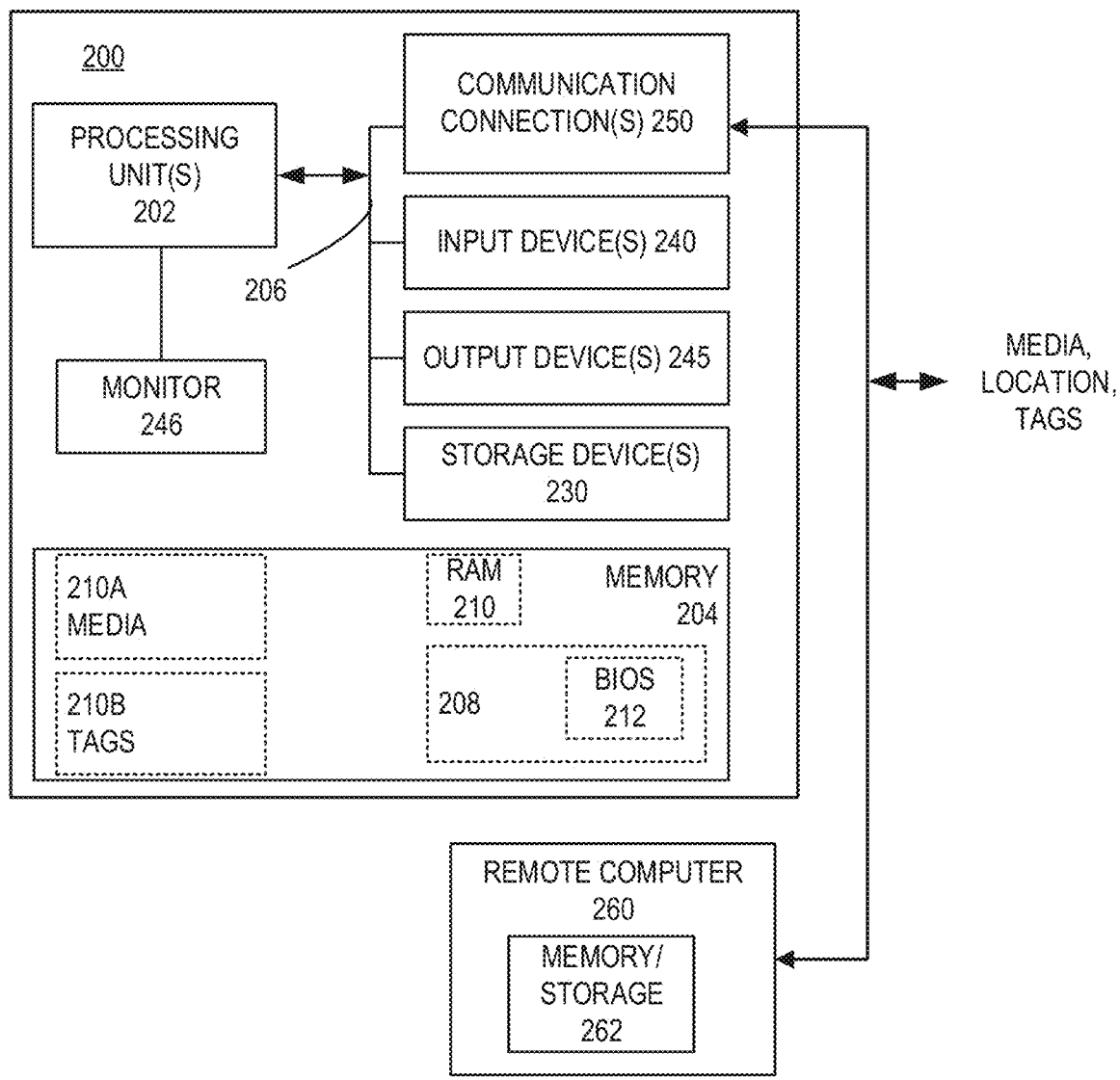
FIG. 5 is a schematic block diagram of a representative computing environment.

FIG. 5 and the following discussion are intended to provide a brief, general description of an exemplary computing environment in which the disclosed consumables dispenser screen and multimedia content delivery system technology may be implemented. For example, the methods and processes described herein can be carried out by a processor configured similarly to the computing environment described below. Moreover, the disclosed technology may be implemented with other computer system configurations, including hand held devices, digital signal processors (DSPs), multiprocessor systems, microprocessor-based or programmable consumer electronics, network PCs, minicomputers, mainframe computers, graphics processing units (GPUs), and the like. The disclosed technologies may also be practiced in distributed computing environments, such as remote server or cloud computing environments, where tasks are performed by remote processing devices that are linked through a communications network.

With reference to FIG. 5, an exemplary system for implementing the disclosed technology includes a general-purpose controller in the form of an exemplary PC 200, including one or more processing units 202, a system memory 204, and a system bus 206 that couples various system components including the system memory 204 to the one or more processing units 202. The system bus 206 may be any of several types of bus structures including a memory bus or memory controller, a peripheral bus, and a local bus using any of a variety of bus architectures. The exemplary system memory 204 includes read only memory (ROM) 208 and random-access memory (RAM) 210. A basic input/output system (BIOS) 212, containing the basic routines that help with the transfer of information between elements within the PC 200, is stored in ROM 208. In the example of FIG. 5, data and processor-executable instructions for controlling operation of the displays, processing, multimedia data transmission and receipt, etc., are stored in a memory 210A, and data and processor-executable instructions for processing data received from the CMS system and tags associated with particular dispensers and/or instructions for delivering multimedia data files to particular dispensers are stored in memory 210B.

The exemplary PC 200 further includes one or more storage devices 230 such as a hard disk drive for reading from and writing to a hard disk, a magnetic disk drive for reading from or writing to a removable magnetic disk, and an optical disk drive. Such storage devices can be connected to the system bus 206 by a hard disk drive interface, a magnetic disk drive interface, and an optical drive interface, respectively. The drives and their associated computer readable media provide nonvolatile storage of computer-readable instructions, data structures, program modules, and other data for the PC 200. Other types of computer-readable media which can store data that is accessible by a PC, such as magnetic cassettes, flash memory cards, digital video disks.

A number of program modules may be stored in the storage devices 230 including an operating system, one or more application programs, other program modules, and program data. A user may enter commands and information into the PC 200 through one or more input devices 240 such as a keyboard and a pointing device such as a mouse. A monitor 246 or other type of display device is also connected to the system bus 206 via an interface, such as a video adapter. Outputs such as commands, signals, etc., can be transmitted via one or more output devices 245.

The PC 200 may operate in a networked environment using logical connections to one or more remote computers, such as a remote computer 260 including a memory 262. In some examples, one or more network or communication connections 250 are included. The remote computer 260 may be another PC, a server, a router, a network PC, or a peer device or other common network node, and typically includes many or all of the elements described above relative to the PC 200, although only a memory storage device 262 has been illustrated in FIG. 5. The personal computer 200 and/or the remote computer 260 can be connected to a local area network (LAN) and/or a wide area network (WAN). In certain embodiments, the remote computer 260 can comprise a virtual processor implemented in a remote server environment or cloud computing environment.

Explanation of Terms

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

As used in this disclosure and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing quantities of components, forces, moments, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

In view of the many possible embodiments to which the principles of the disclosed technology may be applied, it should be recognized that the illustrated embodiments are only examples and should not be taken as limiting the scope of the disclosure. Rather, the scope of the disclosure is at least as broad as the following claims. We therefore claim all that comes within the scope and spirit of these claims.

The invention claimed is:

1. A method, comprising:
    tagging, via a user interface of a content management system, a consumables dispenser with one or more first tags and multimedia data files with one or more second tags, the consumables dispenser comprising a display screen and a transceiver, wherein the first and second tags are character strings or numerical values that represent types of product or types of business;
    selecting a subset of the multimedia data files based on matching the one or more first tags with the one or more second tags;
    transmitting the subset of the multimedia data files to a multimedia caching server associated with the consumables dispenser; and
    over a network, transmitting the subset of the multimedia data files from the multimedia caching server to the transceiver of the consumables dispenser for displaying to users of the consumables dispenser on the display screen.

2. The method of claim 1, wherein the consumables dispenser is a paper product dispenser.

3. The method of claim 1, wherein the multimedia caching server is in wireless communication with the content management system.

4. The method of claim 1, wherein the subset of the multimedia data files comprise a playlist of images or videos that are configured to be displayed sequentially or randomly on the display screen of the consumables dispenser.

5. The method of claim 1, wherein selecting the subset of the multimedia data file comprises determining if a selected first tag matches a selected second tag.

6. The method of claim 5, wherein the selected first tag is determined to match the selected second tag if the selected first tag is identical to the selected second tag.

7. The method of claim 5, wherein the selected first tag is determined to match the selected second tag if the selected first tag is a subcategory of the selected second tag or the selected second tag is a subcategory of the selected first tag according to a predefined category dictionary.

8. The method of claim 5, wherein the selected first tag is determined to match the selected second tag if the selected first tag is semantically related to the selected second tag according to a predefined schema.

9. The method of claim 1, wherein the display screen is configured to detect presence or absence of a user of the consumables dispenser.

10. The method of claim 1, further comprising activating the display upon detection of a user being adjacent the consumables dispenser and deactivating the display when no user is detected.

11. A system, comprising:
a plurality of consumables dispensers having respective displays, wherein the consumables dispensers are associated with one or more first tags;
a content management system storing multimedia data files, wherein the multimedia data files are associated with one or more second tags;
a multimedia caching server configured to download a subset of the multimedia data files from the content management system, wherein the subset of the multimedia data files are selected based on matching the one or more first tags with the one or more second tags;
an application programming interface and emulator tool in communication with the multimedia caching server; and
a transceiver in communication with the application programming interface and emulator tool and the plurality of consumables dispensers, wherein the transceiver is configured to provide the subset of the multimedia data files to the displays of the plurality of consumables dispensers,
wherein the first and second tags are character strings or numerical values that represent types of product or types of business, wherein the first and second tags were created via a user interface of a content management system.

12. The system of claim 11, wherein the content management system is located in a cloud computing platform, and wherein the multimedia caching server is located on premise with the plurality of consumables dispensers.

13. The system of claim 11, wherein the plurality of consumables dispensers are configured to dispense paper product.

14. The system of claim 11, wherein the content management system comprises a user interface through which the subset of the multimedia data files can be manually selected.

15. The system of claim 11, wherein at least some of the first tags represent locations of the plurality of consumables dispensers.

16. The system of claim 11, wherein the second tags of the subset of the multimedia data files match the first tags of the plurality of consumables dispensers.

17. The system of claim 11, wherein the subset of the multimedia data files comprise a playlist of images or videos that are configured to be displayed sequentially or randomly on the displays of the plurality of consumables dispensers.

18. The system of claim 11, wherein each of the consumables dispensers comprises a sensor configured to detect presence or absence of a user of the consumables dispenser, wherein display of the selected multimedia data files on the consumable dispenser is enabled upon detection of the user's presence and disabled upon detection of the user's absence.

19. A consumables dispenser, comprising:
a housing configured to receive a consumables product to be dispensed;
a transceiver mounted on the housing and configured to receive selected multimedia data files from a content management system via a multimedia caching server that is in wireless communication with the content management system;
a display screen coupled to the housing and connected to the transceiver, wherein the display screen is configured to display the selected multimedia data files to a user of the consumables dispensers; and
a sensor configured to detect presence or absence of the user of the consumables dispensers, wherein display of the selected multimedia data files on the display screen is enabled upon detection of the user's presence and disabled upon detection of the user's absence,
wherein the consumables dispenser is associated with one or more first tags, wherein the selected multimedia data files are associated with one or more second tags, wherein the first and second tags are character strings or numerical values that represent types of product or types of business, wherein the one or more first tags match the one or more second tags, wherein the first and second tags were created via a user interface of a content management system.

20. The consumables dispenser of claim 19, wherein the consumables dispenser is configured as a paper towel dispenser.

* * * * *